United States Patent
Wan et al.

(10) Patent No.: US 11,958,942 B1
(45) Date of Patent: Apr. 16, 2024

(54) METHOD FOR RECYCLING UREA-FORMALDEHYDE (UF) AND RAW MATERIALS FROM WOOD-BASED PANEL, AND USE THEREOF

(71) Applicant: Southwest Forestry University, Kunming (CN)

(72) Inventors: Hui Wan, Kunming (CN); An Mao, Kunming (CN); Hong Lei, Kunming (CN); Xiaojian Zhou, Kunming (CN); Zhi Li, Kunming (CN); Long Yang, Kunming (CN); Linkun Xie, Kunming (CN); Guanben Du, Kunming (CN)

(73) Assignee: Southwest Forestry University, Kunming (CN)

( * ) Notice: Subject to any disclaimer, the term of this patent is extended or adjusted under 35 U.S.C. 154(b) by 0 days.

(21) Appl. No.: 18/298,261

(22) Filed: Apr. 10, 2023

(51) Int. Cl.
| C08J 11/08 | (2006.01) |
| B27N 1/00 | (2006.01) |
| B27N 3/02 | (2006.01) |
| B27N 3/08 | (2006.01) |
| C08L 61/24 | (2006.01) |
| C08L 97/02 | (2006.01) |

(52) U.S. Cl.
CPC ............... *C08J 11/08* (2013.01); *B27N 1/00* (2013.01); *B27N 3/02* (2013.01); *B27N 3/08* (2013.01); *C08L 61/24* (2013.01); *C08L 97/02* (2013.01); *C08J 2361/24* (2013.01)

(58) Field of Classification Search
None
See application file for complete search history.

(56) References Cited

U.S. PATENT DOCUMENTS

| 2002/0153107 A1* | 10/2002 | Roffael | B27N 3/007 428/537.1 |
| 2003/0056873 A1* | 3/2003 | Nakos | B27N 3/00 156/327 |
| 2006/0254731 A1* | 11/2006 | Jawaid | B27N 3/007 162/50 |
| 2019/0241713 A1* | 8/2019 | Sothje | C08G 8/32 |
| 2020/0122438 A1* | 4/2020 | Stadler | B27N 3/007 |
| 2023/0002584 A1* | 1/2023 | Fechter | C08L 97/02 |

FOREIGN PATENT DOCUMENTS

| CN | 103157653 A | | 6/2013 | |
| CN | 109485811 A | | 3/2019 | |
| CN | 108753221 B | * | 11/2020 | ............... B27D 1/04 |
| CN | 114290472 A | * | 4/2022 | |

OTHER PUBLICATIONS

Translation CN 11490472A (Year: 2022).*
Translation CN 108753221B (Year: 2020).*

* cited by examiner

*Primary Examiner* — Mary Lynn F Theisen
(74) *Attorney, Agent, or Firm* — Fox Rothschild LLP

(57) ABSTRACT

The present disclosure provides a method for recycling urea-formaldehyde (UF) from a wood-based panel. In the present disclosure, the UF is depolymerized by an ultrasonic treatment, and depolymerized UF can be reused for UF manufacture and wood-based panel production. The recycled and treated UF can be repeatedly used in wood-based panel manufacture without affecting performances of the wood-based panel. UF-glued wood-based panels can be recycled, and a recycled wood-based panel raw material can replace at least 50% of a non-recycled wood-based raw material for particle board production without affecting performances of the wood-based panel.

4 Claims, No Drawings

METHOD FOR RECYCLING UREA-FORMALDEHYDE (UF) AND RAW MATERIALS FROM WOOD-BASED PANEL, AND USE THEREOF

TECHNICAL FIELD

The present disclosure belongs to the technical field of resource recovery, and in particular relates to a method for recycling urea-formaldehyde (UF) and raw materials from a wood-based panel, and use thereof.

BACKGROUND

Global consumption of urea-formaldehyde (UF) (including melamine-UF) reached over 1.4 million tons in 2015. The vast majority of UF was used in the production of wood-based panels, such as high-density fiberboard, medium-density fiberboard, particle board, and plywood. In 2019, about 140 million cubic meters of wood-based panel materials bonded with thermosetting artificial resins such as the UF were produced in China. From a perspective of the product life cycle, a considerable amount of wood-based panels are going to be withdrawn from service annually, and need to be properly disposed of to avoid negative environmental impacts. However, there are no plans globally to recycle these wood-based panels, let alone the UF contained therein. As a product of polymerized condensation on the formaldehyde and urea, UF is the most used resin in wood composite adhesives. However, not many people really realize that the polymerized condensation of UF is actually reversible, and leads to the problem of formaldehyde release from UF products. That is to say, the cross-linking of formaldehyde and urea is not immobilized. Under certain favorable temperature, pH value, and moisture, cross-linked UF is depolymerized, and depolymerized UF can be reused for UF manufacture and wood-based panel production. However, the depolymerized UF that is recycled under unfavorable conditions may change chemical properties of the wood materials glued by this type of UF, thus affecting the normal production of wood-based panels. On one hand, this explains that why currently published patents or technologies related to UF degradation cannot be effectively used in the wood-based panel production. On the other hand, this also indicates that there is a need to find a better depolymerization and separation method of the recycled UF. In this way, the wood raw materials of the depolymerized UF and UF-glued wood-based panel may play a huge potential in the manufacture of new UF and new wood-composited wood-based panel materials.

SUMMARY

Aiming at the above technical problems, the present disclosure provides a method for recycling urea-formaldehyde (UF) and raw materials from a wood-based panel, and use thereof.

The present disclosure provides a method for recycling urea-formaldehyde (UF) from a wood-based panel, including the following steps:
(1) cutting a UF-glued wood-based panel into 2.54 mm×5.08 mm panel pieces, placing the panel pieces and distilled water at a weight ratio of 1:5 in an ultrasonic processor, and conducting an ultrasonic treatment at an ultrasonic frequency of 40 kHz and 50° C. to 80° C. for 40 min to 100 min to obtain a UF aqueous solution I and recycled wood-based panel pieces;
(2) taking out the recycled wood-based panel pieces, conducting filtering on the UF aqueous solution I obtained in step (1) with a 60-mesh filter to obtain a UF aqueous solution II, and centrifuging the UF aqueous solution II in a centrifuge at 10,000 rpm for 2 h to 6 h to obtain recycled UF; and
(3) freezing the recycled UF obtained in step (2) at −4° C. for 1 d, and conducting freeze-drying in a freeze dryer under a vacuum degree of 80 Pas for 6 d to obtain a fully recycled UF solid.

The present disclosure further provides use of a recycled UF solid in wood-based panel production, including the following steps:
(1) grinding the recycled UF solid into a powder of less than 100 mesh, and heating in a sealed environment at 130° C. for 1 h in a 45% formaldehyde solution with a pH value of 9 to obtain a dissolved powder;
(2) mixing the dissolved powder with industrial UF to replace 10% of the recycled UF solid to obtain mixed UF; and
(3) using the mixed UF to prepare the wood-based panel.

The present disclosure further provides use of a recycled wood-based panel in production of a new particle board, including the following steps:
(1) soaking the recycled wood-based panel in a pool at a room temperature for half an hour;
(2) heat-grinding an obtained soaked recycled wood-based panel with a moisture content of 77% in a heat grinder to obtain a recycled wood-based panel raw material; and
(3) mixing the recycled wood-based panel raw material with industrial UF, using the obtained mixture as a particle board core layer to produce a common particle board, and conducting hot pressing to obtain the new particle board containing 50% of a recycled particle board raw material, where in the common particle board, an upper surface layer, the core layer, and a lower surface layer are at a ratio of 25:50:25, and the recycled particle board raw material has a utilization rate of 50%.

Preferably, in step (2), the heat-grinding is conducted at a heat-grinding rate of 1,500 rpm, a heat-grinding temperature of 100° C. to 120° C., and a refiner plate clearance of 0.4 mm to 0.6 mm.

In the present disclosure, about 94% of the UF in the wood-based panel can be recycled by the method. The UF recycled by the method can replace at least 10% of non-recycled UF without affecting performances of the wood-based panel. The UF-glued wood-based panels can be recycled by the method, and a recycled wood-based panel raw material can replace 50% of a non-recycled wood-based raw material for particle board production without affecting performances of the wood-based panel.

DETAILED DESCRIPTION OF THE EMBODIMENTS

Examples

A method for recycling UF from a wood-based panel included the following steps:
(1) a UF-glued wood-based panel was cut into 2.54 mm×5.08 mm panel pieces, the panel pieces and distilled water at a weight ratio of 1:5 were placed in an ultrasonic processor, and an ultrasonic treatment was conducted at an ultrasonic frequency of 40 kHz and 50° C. to 80° C. for 40 min to 100 min to obtain a UF aqueous solution I and recycled wood-based panel pieces;

(2) the recycled wood-based panel pieces were taken out, filtering was conducted on the UF aqueous solution I obtained in step (1) with a 60-mesh filter to obtain a UF aqueous solution II, and the UF aqueous solution II was centrifuged in a centrifuge at 10,000 rpm for 2 h to 6 h to obtain recycled UF; and (3) the recycled UF obtained in step (2) was frozen at −4° C. for 1 d, and freeze-drying was conducted in a freeze dryer under a vacuum degree of 80 Pas for 6 d to obtain a fully recycled UF solid.

Use of a recycled UF solid in wood-based panel production included the following steps:

(1) the recycled UF solid was ground into a powder of less than 100 mesh, and heated in a sealed environment at 130° C. for 1 h in a 45% formaldehyde solution with a pH value of 9 to obtain a dissolved powder;

(2) the dissolved powder was mixed with industrial UF to replace 10% of UF solid to obtain mixed UF; and (3) the mixed UF was used to prepare the wood-based panel.

Test of recovery rate of recycled UF were as follows:

The recovery rate of the UF was measured at different temperatures, times, and pH values. The experimental results were as follows:

| | Sizing amount (g) | UF recovery amount (g) | Recovery rate (%) |
|---|---|---|---|
| Recovery conditions: at 80° C. for 40 min with distilled water, pH = 7.9 | 0.19 | 0.14 | 74 |
| Recovery conditions: at 80° C. for 100 min with distilled water, pH = 8.5 | 0.17 | 0.16 | 94 |
| Recovery conditions: at 50° C. for 40 min with distilled water, pH = 7.9 | 0.17 | 0.1 | 60 |
| Recovery conditions: at 50° C. for 100 min with distilled water, pH = 8.2 | 0.16 | 0.11 | 68 |

The experimental results showed that when the recycling was conducted at 50° C., the recovery rate increased from 60% to 68% with the extension of the treatment time from 40 min to 100 min. When the recycling was conducted at 80° C., the recovery rate increased from 74% to 94% with the extension of the treatment time from 40 min to 100 min.

Even under poor treatment conditions, about 60% of the UF in the wood-based panel could still be recycled by the method of the present disclosure. When the recycling was conducted: at 80° C. for 100 min, the recovery rate could reach approximately 94%.

The tensile strength test of recycled UF used in the production of wood-based panel:

A recycled and dissolved UF solution was mixed with a self-made resin under a UF molar ratio of 1.3, and UF 1 was obtained by replacing 5% of a resin solid content according to a conventional UF production process. UF 2 was obtained by replacing 10% of the resin solid content with the recycled and dissolved UF solution and mixed with an industrial UF. A plywood was separately glued with the UF 1 and the UF 2. The processing parameters included: material: a defect-free poplar veneer with a specific gravity of 0.53 and an average moisture content of 9.3%; glue amount: 200 g/m 2 (gluing on both sides); hot pressing pressure: 5 MPa; hot pressing temperature: 150° C.; hot pressing time: 5 min. This experiment was repeated 6 times. After hot pressing, the prepared plywood samples were stored in the laboratory for 2 d. The plywood samples were submerged in water at 30° C.±3° C. for 2 h, dried in an oven at 63° C.±3° C. for 1 h, and then tested for tensile strength according to GB/T 9846-2015. Test results were shown in Table 1. As a control, the properties of a plywood glued by self-made UF without adding recycled UF and a plywood bonded by industrial UF without any treatment were also listed in the table.

TABLE 1

| | Tensile strengths plywood samples (MPa) | | |
|---|---|---|---|
| Resin type | Recycled resin replacement rate(%) | Dry strength | Wet strength |
| Self-made | 0 | 1.06 (0.16) A | 0.78 (0.10) A |
| UF 1 | 5 | 1.18 (0.29) A | 0.92 (0.26) A |
| Industrial UF | 0 | 2.44 (0.66) B | N/A |
| UF 2 | 10% | 2.7 (0.52) B | N/A |

Note:
the values in brackets were sample standard deviations
a) Within a same column, values with a same letter were not statistically differnt at the 95% confidence level.

The data showed that the addition of 5% recycled UF did not affect the dry and wet tensile strengths of the tested plywood samples when mixed with self-made UF, although the data showed that the addition of 5% recycled UF tended to increase the dry and wet tensile strengths of the tested plywood samples compared to the control UF.

The data also showed that the addition of 10% recycled UF did not affect the dry tensile strengths of the tested plywood samples when mixed with the industrial UF, although the data showed that the addition of 10% recycled UF tended to increase the dry tensile strength of the tested plywood samples compared to the control UF.

Compared with the national standard, all plywood samples containing recycled UF had the tensile strength meeting the requirement of the third-grade plywood of GB/T9846-2015. This showed that the recycled UF in the production of new plywood did not affect the properties of the plywood or the performances of the UF. Therefore, it is feasible to use recycled UF in the production of wood-composited wood-based panels.

[1] Use of a recycled wood-based panel in production of a new particle board included the following steps:

(1) the recycled wood-based panel was soaked in a pool at a room temperature for half an hour;

(2) an obtained soaked recycled wood-based panel with a moisture content of 77% was heat-ground in a heat grinder to obtain a recycled wood-based panel raw material; and (3) the recycled wood-based panel raw material was mixed with industrial UF, an obtained mixture was used as a particle board core layer to produce a common particle board, and hot pressing was conducted to obtain the new particle board containing 50% of a recycled particle board raw material, where in the common particle board, an upper surface layer, the core layer, and a lower surface layer were at a ratio of 25:50:25, and the recycled particle board raw material had a utilization rate of 50%.

A preferred result is that in step (2), the heat-grinding is conducted at a heat-grinding rate of 1,500 rpm, a heat-grinding temperature of 100° C. to 120° C., and a refiner plate clearance of 0.4 mm to 0.6 mm.

The specific raw materials, the preparation and hot pressing conditions, as well as the performance test results of an obtained particle board (thickness expansion rate, water absorption, flexural strength, flexural modulus of elasticity, and internal bonding strength) were listed in Table 2 and Table 3.

TABLE 2

| Manufacturing parameters of particle board | |
| --- | --- |
| Particle board dimension | 12.7 mm × 610 mm × 610 mm |
| Particle board structure | Three layers (upper surface (layer): core layer: lower surface (layer) = 25:50:25) |
| Particle board raw material | Recycled particle board and commercial particle board raw materials |
| Adhesive | Commercial UF |
| Slab moisture content | Surface layers: 10% to 11%; core layer: 5% to 6% |
| Waterproof agent | 1% emulsified paraffin (with a solid content of 58%) |
| Adhesive percentage (%) | Surface layers: 10 (solid content); core layer: 8 (solid content) |
| Catalyst | Surface layers: 1% NH4Cl; core layer: 2.4% NH4Cl, based on the weight of UF solution, using 20% solution concentration |
| Glue mixing machine | 1.33 m (depth) × 1.8 m (diameter) |
| Glue mixing time | 4 min |
| Particle board density | 688 kg/m³ |
| Hot pressing temperature | 180° C. |
| Hot pressing time | 150 seconds |
| Deflation time | 20 seconds |
| Hot pressing pressure | 4.8 MPa |
| Number of repetitions | 3 |
| Equilibration time | Equilibration for 3 weeks in an environment with a relative moisture content of 65% at 20° C. |

TABLE 3

Performance comparison of recycled particle boards

| | | | | | | | | | | |
| --- | --- | --- | --- | --- | --- | --- | --- | --- | --- | --- |
| Heat-grinding rate (rpm) | | 1500 | | | | | | | | |
| Heat-grinding temperature (° C.) | 170* | | 120 | | | | 100 | | | |
| Refiner plate clearance (mm) | 0.007 | 0.4 | 0.5 | | 0.6 | | 0.4 | | 0.5 | 0.6 |
| Preheating time (min) | 3 | 1 | 1 | | 1 | | 1 | | 1 | 1 |
| Hot pressing time (sec) | 150 | 150 | 150 | 360 | 150 | | 150 | | 150 | 150 |
| Pressure (MPa) | 4.8 | 5.2 | 4.8 | 4.8 | 2.1 | 3.4 | 4.8 | | 4.8 | 4.8 |
| Density (kg/m³) | $726^F$ (3.7) | $765^B$ (3.8) | $750^{CBD}$ (4.9) | $930^A$ (3.7) | $732^{DE}$ (4.5) | $753^{CB}$ (2.5) | $748^{CED}$ (3.5) | $745^{CED}$ (2.6) | $752^{CBD}$ (2.8) | $735^{FED}$ (3.4) |
| Internal bonding strength(MPa) | $0.71^E$ (11.8) | $1.00^A$ (11.9) | $0.99^{AB}$ (12.1) | $0.97^{AB}$ (29.8) | $0.88^{ABC}$ (7.8) | $0.86^{BCD}$ (11.4) | $0.91^{ABC}$ (12.5) | $0.83^{CDE}$ (10.2) | $0.97^{AB}$ (7.1) | $0.74^{ED}$ (13.5) |
| Elastic modulus(GPa) | $2.66^A$ (5.8) | $2.44^{AB}$ (13.6) | $2.34^{AB}$ (16.7) | $2.40^{AB}$ (13.1) | $1.90^{CD}$ (13.0) | $1.80^D$ (16.3) | $2.19^{BCD}$ (13.0) | $2.26^{ABC}$ (12.9) | $1.86^{CD}$ (18.3) | $1.89^{CD}$ (16.9) |
| Flexural strength(MPa) | $16.02^{ABC}$ (6.8) | $16.29^{AB}$ (14.2) | $16.06^{ABC}$ (14.6) | $17.04^A$ (6.6) | $13.3^C$ (13.2) | $13.2^C$ (12.6) | $13.91^{BC}$ (13.7) | $16.67^{AB}$ (12.9) | $14.25^{ABC}$ (19.3) | $13.89^{BC}$ (18.2) |
| Thickness expansion rate (%) | $5.76^{AB}$ (11.1) | $5.71^{AB}$ (9.5) | $5.26^B$ (10.3) | $6.69^A$ (62.2) | $5.17^B$ (8.8) | $5.25^B$ (4.0) | $5.35^B$ (16.7) | $5.45^B$ (5.4) | $5.95^{AB}$ (9.0) | $5.53^B$ (8.8) |
| Water absorption (%) | 15.25 | 12.35 | 11.92 | 12.60 | 12.15 | 13.01 | 12.55 | 13.31 | 13.72 | 13.58 |

Note:
the values in parentheses were coefficient of variation of the samples. In different cells of a same row, the values with a same letter were not statistically different at the 95% confidence level.
1. *indicates control Table 2 listed the experimental operating parameters of a general particle board. Table 3 presented the performance data of a particle board containing 50% of recycled particle board raw materials. The same table also listed the heat-grinding parameters for preparing the recycled particle board raw materials. Table 3 showed that by using the experimental operating parameters of the particle board listed in Table 2, when a density of the experimental product was about 750 kg/m³, 50% of the recycled particle board raw materials produced at a heat-grinding rate of 1,500 rpm, a heat-grinding temperature of 100° C. to 120° C., and a refiner plate clearance of 0.4 mm were added during the particle board production, the recycled particle board raw materials could make the performance of the produced particle board meet the requirements of GB/T4897-2015 for P6-grade particle boards. Table 3 also showed that a particle board using the recycled particle board raw materials after heat-grinding as a core layer had higher internal bonding strength and flexural strength, as well as lower thickness expansion rate and water absorption compared to those of the particle board obtained by non-recycled UF-glued particle board raw materials in the control. This illustrated the advantages of particle board produced with the listed heat-grinding parameters. The above results prove that the recycled UF-glued particle board raw materials for particle board production do not affect the quality of particle board, and it is feasible for the recycled UF-glued particle board raw materials to be used for particle board production to manufacture new particle boards.

More specifically, 50% of the recycled UF-glued particle board raw materials were placed in a core layer of a newly manufactured particle board. Moreover, the raw material of the particle board core layer is produced at a heat-grinding rate of 1,500 rpm, a heat-grinding temperature of 100° C. to 120° C., a preheating time of 1 min, and a refiner plate clearance of 0.4 mm. Furthermore, the particle board is manufactured with a hot pressing temperature of 180° C., a hot pressing time of 150 sec, and a hot pressing pressure of 4.8 MPa, under a particle board density of 688 kg/m³, 10% glue and 1% paraffin on the surface layers of the particle board, and 8% glue and 1% paraffin on the core layer of the particle board, and the quality of the particle board meets the requirements of GB/T4897-2015 for P6-grade panels.

What is claimed is:

1. A method for recycling urea-formaldehyde (UF) from a wood-based panel, comprising the following steps:
   (1) cutting a UF-glued wood-based panel into 2.54 mm×5.08 mm panel pieces, placing the panel pieces and distilled water at a weight ratio of 1:5 in an ultrasonic processor, and conducting an ultrasonic treatment at an ultrasonic frequency of 40 kHz and 50° C. to 80° C. for 40 min to 100 min to obtain a UF aqueous solution I and recycled wood-based panel pieces;
   (2) taking out the recycled wood-based panel pieces, conducting filtering on the UF aqueous solution I obtained in step (1) with a 60-mesh filter to obtain a UF aqueous solution II, and centrifuging the UF aqueous solution II in a centrifuge at 10,000 rpm for 2 h to 6 h to obtain a recycled UF; and
   (3) freezing the recycled UF obtained in step (2) at −4° C. for 1 d, and conducting freeze-drying in a freeze dryer under a vacuum degree of 80 Pas for 6 d to obtain a recycled UF solid.

2. A method for producing a wood-based panel, comprising:
   (1) grinding the recycled UF solid obtained in claim 1 into a powder of less than 100 mesh, and heating in a sealed environment at 130° C. for 1 h in a 45% formaldehyde solution with a pH value of 9 to obtain a dissolved powder;
   (2) mixing the dissolved powder with industrial UF to replace 10% of UF solid to obtain mixed UF; and
   (3) using the mixed UF to prepare the wood-based panel.

3. A method for producing a new particle board, comprising:
   (1) cutting a UF-glued wood-based panel into 2.54 mm×5.08 mm panel pieces, placing the panel pieces and distilled water at a weight ratio of 1:5 in an ultrasonic processor, and conducting an ultrasonic treatment at an ultrasonic frequency of 40 kHz and 50° C. to 80° C. for 40 min to 100 min to obtain a recycled wood-based panel pieces; soaking the recycled wood-based panel pieces in a pool at a room temperature for half an hour;
   (2) heat-grinding the recycled wood-based panel pieces with a moisture content of 77% in a heat grinder to obtain a recycled wood-based panel raw material; and
   (3) mixing the recycled wood-based panel raw material with industrial UF to obtain a mixture, using the mixture as a particle board core layer to produce a common particle board, and conducting hot pressing to obtain the new particle board containing 50% of a recycled particle board raw material, wherein in the common particle board, an upper surface layer, the core layer, and a lower surface layer are at a ratio of 25:50:25, and the recycled particle board raw material has a utilization rate of 50%.

4. The method for producing a new particle board according to claim 3, wherein in step (2), the heat-grinding is conducted at a heat-grinding rate of 1,500 rpm, a heat-grinding temperature of 100° C. to 120° C., and a refiner plate clearance of 0.4 mm to 0.6 mm.

\* \* \* \* \*